(12) United States Patent
Furuya

(10) Patent No.: US 6,630,081 B1
(45) Date of Patent: Oct. 7, 2003

(54) PROCESS FOR PRODUCING GAS DIFFUSION ELECTRODE MATERIAL

(75) Inventor: Nagakazu Furuya, 6-24-604, Kitaguchi 1-chome, Kofu-shi, Yamanashi 400-0024 (JP)

(73) Assignees: Nagakazu Furuya, Yamanaski (JP); Toagosei Co., Ltd., Tokyo (JP); Mitsui Chemicals, Inc., Tokyo (JP); Kaneka Corporation, Osaka (JP)

( * ) Notice: Subject to any disclaimer, the term of this patent is extended or adjusted under 35 U.S.C. 154(b) by 202 days.

(21) Appl. No.: 09/609,240

(22) Filed: Jun. 30, 2000

(30) Foreign Application Priority Data

Jun. 30, 1999 (JP) .............................. 11-186082
Jun. 30, 1999 (JP) .............................. 11-186083
Jun. 30, 1999 (JP) .............................. 11-186084

(51) Int. Cl.$^7$ .............................. H01B 1/06; H01C 1/04
(52) U.S. Cl. .................. 252/510; 252/500; 252/502; 252/511; 106/31.92; 204/280; 204/282; 204/283; 429/40; 429/41; 429/42; 429/43
(58) Field of Search ................................ 252/502, 510, 252/511, 500; 106/31.92; 204/280, 282, 283; 429/40, 41, 42, 43

(56) References Cited

U.S. PATENT DOCUMENTS

| | | | |
|---|---|---|---|
| 4,877,694 A | * | 10/1989 | Solomon et al. .............. 429/27 |
| 5,216,068 A | | 6/1993 | Zipplies |
| 5,312,701 A | | 5/1994 | Khasin et al. |
| 5,716,437 A | * | 2/1998 | Denton et al. .......... 106/31.92 |

FOREIGN PATENT DOCUMENTS

| | | |
|---|---|---|
| EP | 0410946 A1 | 1/1991 |
| GB | 1286686 | 8/1972 |
| JP | 57-104678 | 6/1982 |
| JP | 6-57474 | 3/1994 |
| JP | 6-236763 | 8/1994 |
| JP | 6-316784 | 11/1994 |
| JP | 7003484 | 1/1995 |
| JP | 11-80985 | 3/1999 |

\* cited by examiner

Primary Examiner—Yogendra N. Gupta
Assistant Examiner—D G Hamlin
(74) Attorney, Agent, or Firm—Young & Thompson

(57) ABSTRACT

A process for producing a reaction layer material or gas feed layer material for a gas diffusion electrode, which comprises the steps of: dispersing a gas diffusion electrode raw material excluding polytetrafluoroethylene in to an organic solvent to prepare a dispersion; adding polytetrafluoroethylene to the dispersion to prepare a mixture; and mixing the mixture. In the process, polytetrafluoroethylene is added in the form of dispersion or fine powder.

9 Claims, No Drawings

PROCESS FOR PRODUCING GAS DIFFUSION ELECTRODE MATERIAL

FIELD OF THE INVENTION

The present invention relates to a process for producing a material, e.g., a mixture of a carbon black and polytetrafluoroethylene (hereinafter referred to as "PTFE") or a mixture of silver and PTFE, for use forming a reaction layer or gas feed layer of a gas diffusion electrode. Specifically, the invention relates to a process for producing the above-described mixture while minimizing the use of a surfactant.

DESCRIPTION OF THE RELATED ART

In a conventional process for producing a reaction layer of a gas diffusion electrode, a reaction layer material or a gas feed layer material has been obtained in the following manner. First, a hydrophilic carbon black is dispersed into water containing a surfactant, and a finely particulate catalyst, e.g., silver, is deposited on or added to the dispersed carbon black. Thereafter, a hydrophobic carbon black is dispersed into the dispersion, and a PTFE dispersion is then mixed therewith to prepare a dispersion.

Subsequently, an alcohol is added to the resultant dispersion to self-organize it, and the self-organized dispersion is filtered and dried to obtain a reaction layer material powder or gas feed layer material powder.

In preparing the carbon black dispersion in the conventional process described above, water is added to the carbon blacks in an amount as large as at least 30 times by weight the amount of the carbon blacks and a surfactant is added in an amount at least 2%. After this dispersion is mixed with a PTFE dispersion, an alcohol is added thereto in the same amount as the amount of the resultant dispersion to cause coagulation, and the resultant mixture is filtered and dried to produce the reaction layer material powder or gas feed layer material powder. For inexpensively producing the material powder, it is necessary to reduce the amounts of the water, surfactant, and alcohol used as sub-raw materials.

When the use amounts of these ingredients are reduced, this results in a decrease in the amount of all the raw materials to be treated. As a result, a smaller equipment size is usable and a cost reduction is possible accordingly. Furthermore, in the case where the dispersion containing carbon blacks and PTFE particles is used by any of a coating method in which the dispersion is applied as it is to form a film, a spraying method in which the dispersion is applied by spraying to form a film and a spray drying method in which the dispersion is spray-dried to form a powder, this technique has had a drawback that a large amount of energy is necessary for removing the solution because of too large an amount thereof. It has hence been desired to diminish to the lowest possible level the water and surfactant to be used. In particular, there has been a strong desire for a reduction of the surfactant amount because use of a large amount of a surfactant raises difficulties in removing the surfactant in a later step and in discarding the surfactant as a waste.

SUMMARY OF THE INVENTION

The invention has been achieved in view of the above-described problems in the conventional techniques.

Accordingly, an object of the invention is to provide a process for producing gas diffusion electrode materials which is effective in minimizing the use amounts of water and a surfactant and attaining a cost reduction brought about by equipment size reduction, contributes to energy saving, and is effective in shortening the production time.

Other objects and effects of the present invention will become apparent from the following description.

The conventional process requires a surfactant for dispersing carbon blacks into water. In order to overcome this problem, the present inventor made extensive investigations on means for mixing which are sufficient to disperse raw materials into solvents such as, e.g., alcohol solvents, hydrocarbon solvents, and ester solvents, without using a surfactant. Even a hydrophobic carbon black which is not wetted by water is satisfactorily wetted by those organic solvents. It was found that when a PTFE dispersion is added to and mixed with a dispersion prepared by wetting a carbon black by a water-miscible organic solvent, e.g., an alcohol, and dispersing the carbon black thereinto, then the alcohol diffuses into the water that serves as the dispersion medium of the PTFE dispersion and, simultaneously therewith, particles of the carbon black come into spaces among the fine PTFE particles to thereby form a dispersion structure desirable for gas diffusion electrodes. Namely, it was found that when a PTFE dispersion is mixed with a carbon black dispersed in an alcohol, then the PTFE dispersion self-organizes to form a satisfactory reaction layer structure. The invention has thus been completed.

It was further found that a dispersion structure desirable for gas diffusion electrodes is obtained also by wetting a carbon black by an alcohol and dispersing the carbon black thereinto, adding a fine PTFE powder to the dispersion to allow the PTFE particles to sufficiently absorb the solvent, and then subjecting the resultant mixture to an ultrasonic dispersion treatment.

Namely, it has been found that when a carbon black dispersed in an alcohol is mixed with a fine PTFE powder and the solvent is irradiated with ultrasonic, then the fine powder is disaggregated and mixed with the carbon black to give a satisfactory reaction layer structure. The invention has thus been completed.

On the other hand, since a PTFE dispersion is an aqueous dispersion, addition thereof to a water-immiscible solvent, e.g., solvent naphtha, results in separation into two layers. Consequently, a carbon black does not mix with the PTFE in solvent naphtha.

It was, however, found that when the system composed of the oily phase and the aqueous phase separated therefrom is vigorously mixed, then the fine PTFE particles contained in the PTFE dispersion as the aqueous phase move to the oily phase because these particles in themselves are originally hydrophobic, and the carbon black and the PTFE self-organize in the oily phase.

Namely, it was found that when solvent naphtha containing a hydrophilic carbon black and a hydrophobic carbon black both dispersed therein is vigorously shaken together with a PTFE dispersion, then the fine PTFE particles move from the aqueous phase to the oily phase and self-organize together with the carbon blacks in the solvent naphtha to thereby form a satisfactory reaction layer structure. The invention has thus been completed.

It was furthermore found that according to this means, a gas feed layer structure can be similarly formed when solvent naphtha containing a hydrophobic carbon black dispersed therein is vigorously shaken together with a PTFE dispersion.

Specifically, the above-described objects of the present invention have been achieved by providing the following processes.

(1) A process for producing a reaction layer material or gas feed layer material for a gas diffusion electrode, which comprises the steps of:
  dispersing a gas diffusion electrode raw material excluding polytetrafluoroethylene in to an organic solvent to prepare a dispersion;
  adding polytetrafluoroethylene to the dispersion to prepare a mixture; and
  mixing the mixture.

(2) The process according to the above process (1), wherein polytetrafluoroethylene is added in the form of dispersion.

(3) The process according to the above process (1), wherein polytetrafluoroethylene is added in the form of fine powder.

(4) The process according to the above process (1), wherein the mixing is conducted by or with the aid of ultrasonic irradiation or vigorous agitation or shaking.

(5) The process according to the above process (1), wherein the organic solvent comprises a solvent miscible with water.

(6) The process according to the above process (5), wherein the organic solvent comprises at least one member selected from the group consisting of methanol, ethanol, isopropyl alcohol, ethylene glycol, glycerol, and acetone.

(7) The process according to the above process (1), wherein the organic solvent is a solvent immiscible with water.

(8) The process according to the above process (7), wherein the organic solvent comprises at least one member selected from the group consisting of butyl acetate, solvent naphtha, petroleum naphtha, and fluorochemical solvents.

The process of the invention in which a fine PTFE powder is used comprises considerably simplified steps as compared to a conventional process because a surfactant is not added therein. In the case where solvent naphtha is employed as the solvent which case is shown as Example 10 below, a comparison between the process of the invention and the conventional process is summarized as follows.

The novel process according to the invention roughly comprises the following seven steps.
  1. Mixing of a carbon black with solvent naphtha and dispersion of the carbon black
  2. Addition of a fine PTFE powder
  3. Irradiation with ultrasonic
  4. Removal of excess solvent naphtha by compression
  5. Sheet formation by rolling
  6. Drying and solvent removal
  7. Pressing In contrast, a conventional process in which a surfactant is added in a large amount roughly comprises the following eleven steps.
  1. Mixing of a carbon black with water and a surfactant, and dispersion of the carbon black
  2. Addition of a PTFE dispersion
  3. Addition of an alcohol and mixing
  4. Filtration
  5. Drying
  6. Formation of a curdy mixture by addition of solvent naphtha
  7. Sheet formation by rolling
  8. Drying
  9. Removal of the surfactant
  10. Drying
  11. Pressing

DESCRIPTION OF THE PREFERRED EMBODIMENTS

In preparing the reaction layer material for a gas diffusion electrode, a dispersion is first prepared by mixing a hydrophilic carbon black and a hydrophobic carbon black with an organic solvent. The amount of the organic solvent is from 9 to 50 parts (the term "parts" used in the specification means "parts by weight" unless otherwise indicated) per parts of the carbon blacks. As the carbon blacks are mixed with the solvent in a proportion within that range, the mixture changes from a dry powdery state into a liquid state. After sufficient kneading, an ultrasonic horn is directly applied to the mixture. It is possible to add the carbon blacks little by little to the organic solvent while irradiating the solvent with ultrasonic. Ultrasonic irradiation disperses the carbon blacks to a higher degree and, hence, results in an increased viscosity. Besides ultrasonic irradiation, vigorous agitation or shaking may be used for the mixing.

Subsequently, a necessary amount of a PTFE dispersion is added to the carbon black dispersion and dispersed thereinto by stirring. If desired, ultrasonic irradiation may be conducted. The organic solvent to be used may contain water in such a degree that the carbon blacks can be dispersed into the alcohol. When the PTFE dispersion is used in its undiluted state, a mixture having a curdy consistency results. A liquid mixture can be obtained by using a dilution of the PTFE dispersion with water. A surfactant may be added according to need. After the two liquids have been mixed, the carbon blacks are coexistent with the fine PTFE particles in a mixed state. It is considered that in the case where an alcohol is used as the organic solvent, the alcohol contained in the carbon black dispersion causes the PTFE dispersion to self-organize.

In the case where solvent naphtha was used as the organic solvent, the fine PTFE particles move into the solvent naphtha. Ultrasonic irradiation may be conducted. Use of solvent naphtha in an amount of 10 times results in a mixture having a curdy consistency, while use thereof in an amount of 30 times results in a liquid mixture. The amount of solvent naphtha can hence be regulated according to applications. The PTFE dispersion may be used either in its undiluted state or as a dilution with water.

In the case where a fine PTFE powder is added, in place of a PTFE dispersion, to the carbon black dispersion in an organic solvent, the fine PTFE powder in the powder form is added in a necessary amount and the mixture is lightly stirred to disperse the PTFE particles. In this case, the fine PTFE powder is used in an amount necessary for forming a reaction layer. The fine PTFE powder used here is generally one having an average particle diameter of from 0.2 to 0.3 $\mu$m. After the fine PTFE powder has been sufficiently wetted by the organic solvent, e.g., an alcohol, the mixture is irradiated with ultrasonic to disperse the PTFE particles. A surfactant may be added in a small amount according to need; this improves the dispersed state.

Use of the alcohol as an organic solvent in too small an amount results in a mixture having a curdy consistency, while use thereof in too large an amount results in a liquid mixture. Consequently, a use amount thereof is selected while taking account of later treatments.

The dispersion of carbon blacks and fine PTFE particles is applied, as it is as a coating fluid, on a gas feed layer to form a reaction layer. Alternatively, this coating fluid as it is can be applied by spraying to form a reaction layer.

Furthermore, the dispersion can be dried by the spray drying method to obtain a reaction layer material powder. It is possible to prepare the dispersion so that it has a regulated organic-solvent content and to directly form this dispersion into a sheet by the rolling method. It is also possible to use a method comprising drying the dispersion to obtain a reaction layer material powder, adding solvent naphtha to the powder, and forming the resultant mixture into a sheet by the rolling method.

Usable examples of the dispersion medium for dispersing carbon blacks thereinto include alcohols, such as ethanol, methanol and isopropyl alcohol, and acetone. Also usable are organic solvents such as butyl acetate, solvent naphtha, benzene, toluene, xylene, petroleum ether, and fluorine-containing solvents.

In the invention, ingredients such as carbon blacks and PTFE dispersions are referred to as gas diffusion electrode materials, while mixtures obtained by mixing a carbon black dispersion with a PTFE dispersion are referred to as reaction layer raw materials or gas feed layer raw materials.

The gas feed layer material can be produced in the same manner as for the reaction layer material. In the case of a gas feed layer, a hydrophobic carbon black is used as the only carbon black. Consequently, in preparing a dispersion of a hydrophobic carbon black, the carbon black is mixed with an organic solvent, e.g., at least one member selected from the group consisting of methanol, ethanol, isopropyl alcohol, ethylene glycol, glycerol and acetone, or at least one member selected from the group consisting of butyl acetate, solvent naphtha, petroleum naphtha, and fluorochemical solvents. In this case also, the amount of the solvent is from 9 to 50 parts per part by weight of the carbon black. The subsequent procedure also may be the same as for the reaction layer material. Namely, the carbon black is dispersed with ultrasonic irradiation, and a fine PTFE powder in the powder form is added to the resultant dispersion in a necessary amount. This mixture is lightly stirred to disperse the PTFE particles. After the fine PTFE powder has been sufficiently wetted by the solvent, the mixture is irradiated with ultrasonic to disperse the PTFE powder.

Usable examples of the dispersion medium for the carbon black include alcohols such as ethanol, methanol, and isopropyl alcohol, ketones such as acetone, esters such as acetic esters, and hydrocarbon solvents such as solvent naphtha and petroleum ether. Fluorochemical solvents also can be used satisfactorily.

In the drying of the reaction layer material which has been applied or in the spray drying of the dispersion for a reaction layer, the organic solvent vaporizes. By collecting and recovering this organic solvent vapor, not only the cost of the production of the reaction layer material or the like can be reduced, but also problems which may be aroused when the organic solvent vapor is released can be avoided.

EXAMPLES

The invention will be illustrated in greter detail by reference to the following Examples, but the invention should not be construed as being limited thereto. In all Examples, all "parts" and "percents" are "parts by weight" and "percent by weight", respectively, unless otherwise indicated.

Example 1

To 110 parts of isopropyl alcohol were added 3 parts of a hydrophobic carbon black (Denka Black; average particle diameter, 390 Å; manufactured by Denki Kagaku Kogyo K. K.) and 7 parts of a hydrophilic carbon black (AB-12; average particle diameter, 400 Å; a trial product manufactured by Denki Kagaku Kogyo K. K.). After these ingredients were mixed, an ultrasonic horn was applied to the resultant mixture to directly irradiate the mixture with ultrasonic and thereby disperse the carbon blacks. Furthermore, 4 parts of a PTFE dispersion (D-1; average particle diameter, 0.3 μm; manufactured by Daikin Industries, Ltd.) was added thereto, and this mixture was rapidly stirred to self-organize the mixture. The resultant mixture was filtered to obtain a reaction layer material.

The curdy mixture obtained through filtration was superposed as it was on a gas feed layer material formed from a hydrophobic carbon black and a PTFE dispersion. Subsequently, the superposed materials were rolled to produce a gas diffusion electrode sheet composed of a reaction layer and a gas feed layer. This sheet was dried at 80° C. for 3 hours, and the surfactant contained in the PTFE dispersion added was removed with an ethanol extractor. After drying, the sheet was pressed together with a silver gauze at 50 kg/cm$^2$ and 370° C. for 60 seconds to obtain an electrode. The reaction layer of this electrode was coated with an aqueous solution of chloroplatinic acid, and the coating was reduced with hydrogen at 200° C. for 3 hours to obtain a gas diffusion electrode having platinum deposited thereon in an amount of 0.5 mg/cm$^2$.

The oxygen-reducing ability of this electrode was measured at 80° C. in 32% NaOH. As a result, the ability was found to be as high as 0.848 V (vs. RHE) at 30 A/dm$^2$.

Example 2

To 150 parts of ethanol were added 7 parts of a hydrophilic carbon black (AB-12; average particle diameter, 400 Å; a trial product manufactured by Denki Kagaku Kogyo K. K.) and 3 parts of a hydrophobic carbon black (No. 6; average particle diameter, 500 Å; a trial product manufactured by Denki Kagaku Kogyo K. K.). This mixture was treated with an ultrasonic disperser to disperse the carbon blacks to an average particle diameter of 1 μm or smaller. To this dispersion were added 3.5 parts (in terms of silver weight) of fine silver particles (a trial product manufactured by Tanaka Kikinzoku Kogyo K. K.; average particle diameter, 0.1 μm or smaller). The resultant mixture was stirred for mixing. Thereto was further added 4 parts of a PTFE dispersion (D-1; manufactured by Daikin Industries Ltd.). This mixture was stirred for mixing to obtain a reaction layer dispersion. Filtration and drying were easy because of the low water content.

A gas feed layer sheet was produced by the rolling method from a hydrophobic carbon black and a PTFE dispersion. The reaction layer dispersion was applied on this sheet in a thickness of 0.4 mm and dried at 80° C. for 3 hours to obtain a gas feed layer sheet coated with a reaction layer. The surfactant was removed from this sheet with an ethanol extractor. After drying, the sheet was pressed together with a silver gauze at 50 kg/cm$^2$ and 350° C. for 60 seconds to obtain an electrode.

The oxygen-reducing ability of this electrode was measured at 80° C. in 32% NaOH. As a result, the ability was found to be as high as 0.818 V (vs. RHE) at 30 A/dm$^2$.

Example 3

Into 150 parts of glycerol were dispersed 50 parts of fine silver particles (manufactured by Mitsui Mining & Smelting Co., Ltd.; Ag-3010; average particle diameter, 0.1 μm) with an ultrasonic disperser. Thereto was added 10 parts of a PTFE dispersion (D-1; manufactured by Daikin Industries, Ltd.). This mixture was stirred for mixing to obtain a reaction layer dispersion. The excess glycerol was removed therefrom by filtration to obtain a reaction layer coating fluid.

A gas feed layer sheet was produced by the rolling method from a hydrophobic carbon black and a PTFE dispersion. The reaction layer coating fluid was applied on this sheet in a thickness of 0.4 mm and dried at 80° C. for 3 hours to obtain a gas feed layer sheet coated with a reaction layer. The surfactant derived from the PTFE dispersion was removed from this sheet with an ethanol extractor. After drying, the sheet was pressed together with a silver gauze at 50 kg/cm$^2$ and 350° C. for 60 seconds to obtain an electrode.

The oxygen-reducing ability of this electrode was measured at 80° C. in 32% NaOH. As a result, the ability was found to be as high as 0.803 V (vs. RHE) at 30 A/dm$^2$.

Example 4

To 200 parts of solvent naphtha were added 7 parts of a hydrophilic carbon black (AB-12; average particle diameter, 400 Å; a trial product manufactured by Denki Kagaku Kogyo K. K.) and 3 parts of a hydrophobic carbon black (No. 6; average particle diameter, 500 Å; a trial product manufactured by Denki Kagaku Kogyo K. K.). This mixture was treated with an ultrasonic disperser to disperse the carbon blacks. To this dispersion were added 3.5 parts (in terms of silver weight) of fine silver particles (a trial product manufactured by Tanaka Kikinzoku Kogyo K. K.; average particle diameter, 0.1 μm or smaller). The resultant mixture was stirred for mixing. Thereto was further added 4 parts of a PTFE dispersion (D-1; average particle diameter, 0.3 μm; manufactured by Daikin Industries Ltd.). This mixture was irradiated with ultrasonic to obtain a reaction layer dispersion.

A gas feed layer sheet was produced by the rolling method from a hydrophobic carbon black and a PTFE dispersion. The reaction layer dispersion was applied on this sheet in a thickness of 0.4 mm and dried at 80° C. for 3 hours to obtain a gas feed layer sheet coated with a reaction layer. The surfactant was removed from this sheet with an ethanol extractor. After drying, the sheet was pressed together with a silver gauze at 50 kg/cm$^2$ and 350° C. for 60 seconds to obtain an electrode.

The oxygen-reducing ability of this electrode was measured at 80° C. in 32% NaOH. As a result, the ability was found to be as high as 0.818 V (vs. RHE) at 30 A/dm$^2$.

Example 5

Into 150 parts of kerosene were dispersed 50 parts of fine silver particles (manufactured by Mitsui Mining & Smelting Co., Ltd.; Ag-3010; average particle diameter, 0.1 μm) with an ultrasonic disperser. Thereto was added 10 parts of a PTFE dispersion (D-1; manufactured by Daikin Industries, Ltd.). This mixture was stirred for mixing to obtain a reaction layer dispersion. The excess kerosene was removed therefrom by filtration to obtain a reaction layer coating fluid.

A gas feed layer sheet was produced by the rolling method. The reaction layer coating fluid was applied on this sheet in a thickness of 0.4 mm and dried at 80° C. for 3 hours to obtain a gas feed layer sheet coated with a reaction layer.

The surfactant derived from the PTFE dispersion was removed from this sheet with an ethanol extractor. After drying, the sheet was pressed together with a silver gauze at 50 kg/cm$^2$ and 350° C. for 60 seconds to obtain an electrode.

The oxygen-reducing ability of this electrode was measured at 80° C. in 32% NaOH. As a result, the ability was found to be as high as 0.803 V (vs. RHE) at 30 A/dm$^2$.

Example 6

To 100 parts of solvent naphtha was added 10 parts of a hydrophobic carbon black (No. 6; average particle diameter, 500 Å; a trial product manufactured by Denki Kagaku Kogyo K. K.). This mixture was treated with an ultrasonic disperser to disperse the carbon black. To this dispersion was added 6.8 parts of a PTFE dispersion (D-1; average particle diameter, 0.3 μm; manufactured by Daikin Industries, Ltd.). This mixture was irradiated with ultrasonic to obtain a gas feed layer mixture. This mixture coagulated and separated into most of the solvent naphtha and a curdy matter. The excess solvent naphtha was removed from the curdy matter, which was then rolled. Thus, a gas feed layer sheet could be easily produced.

Example 7

To 110 parts of isopropyl alcohol were added 3 parts of a hydrophobic carbon black (Denka Black; average particle diameter, 390 Å; manufactured by Denki Kagaku Kogyo K. K.) and 7 parts of a hydrophilic carbon black (AB-12; average particle diameter, 400 Å; a trial product manufactured by Denki Kagaku Kogyo K. K.). After these ingredients were mixed, the mixture was irradiated with ultrasonic to disperse the carbon blacks. Furthermore, 4 parts of a fine PTFE powder (F-103; manufactured by Daikin Industries, Ltd.) was added thereto, and this mixture was stirred for mixing. An ultrasonic horn was applied to the resultant mixture to directly irradiate the mixture with ultrasonic to disperse the PTFE particles. The excess alcohol was removed by filtration to obtain a reaction layer material.

The curdy mixture obtained through filtration was superposed as it was on a gas feed layer material formed from a hydrophobic carbon black and a PTFE dispersion. Subsequently, the superposed materials were rolled to produce a gas diffusion electrode sheet composed of a reaction layer and a gas feed layer. This sheet was dried at 80° C. for 3 hours and then at 150° C. for 1 hour. Thereafter, the sheet was pressed together with a silver gauze at 50 kg/cm$^2$ and 370° C. for 60 seconds to obtain an electrode. The reaction layer of this electrode was coated with an aqueous solution of chloroplatinic acid, and the coating was reduced with hydrogen at 200° C for 3 hours to obtain a gas diffusion electrode having platinum deposited thereon in an amount of 0.5 mg/cm$^2$.

The oxygen-reducing ability of this electrode was measured at 80° C. in 32% NaOH. As a result, the ability was found to be as high as 0.803 V (vs. RHE) at 30 A/dm$^2$.

Example 8

To 100 parts of solvent naphtha were added 7 parts of a hydrophilic carbon black (AB-12; average particle diameter, 400 Å; a trial product manufactured by Denki Kagaku Kogyo K. K.) and 3 parts of a hydrophobic carbon black (No. 6; average particle diameter, 500 Å; a trial product manufactured by Denki Kagaku Kogyo K. K.). This mixture was treated with an ultrasonic disperser to disperse the carbon blacks. To this dispersion were added 3.5 parts (in terms of silver weight) of fine silver particles (a trial product manufactured by Tanaka Kikinzoku Kogyo K. K.; average particle diameter, 0.1 μm or smaller). The resultant mixture was stirred for mixing. Thereto was further added 4 parts of a fine PTFE powder (F-103; manufactured by Daikin Industries, Ltd.). This mixture was irradiated with ultrasonic to obtain a reaction layer dispersion. This dispersion coagulated and separated into most of the solvent naphtha and a curdy matter.

The curdy mixture obtained through filtration was superposed as it was on a gas feed layer material formed from a hydrophobic carbon black and a PTFE dispersion. Subsequently, the superposed materials were rolled to produce a gas diffusion electrode sheet composed of a reaction layer and a gas feed layer. This sheet was dried at 80° C. for 3 hours and then at 150° C. for 1 hour. Thereafter, the sheet was pressed together with a silver gauze at 50 kg/cm$^2$ and 350° C. for 60 seconds to obtain an electrode.

The oxygen-reducing ability of this electrode was measured at 80° C. in 32% NaOH. As a result, the ability was found to be as high as 0.818 V (vs. RHE) at 30 A/dm$^2$.

Example 9

Into 150 parts of petroleum naphtha were dispersed 50 parts of fine silver particles (manufactured by Mitsui Mining & Smelting Co., Ltd.; Ag-3010; average particle diameter, 0.1 µm) with an ultrasonic disperser. Thereto was added 10 parts of a fine PTFE powder (F-103; manufactured by Daikin Industries, Ltd.). This mixture was irradiated with ultrasonic to disperse the PTFE particles and thereby obtain a reaction layer dispersion. The excess petroleum naphtha was removed therefrom by filtration to obtain a reaction layer coating fluid.

A gas feed layer sheet was produced by the rolling method. The reaction layer coating fluid was applied on this sheet in a thickness of 0.4 mm and dried at 80° C. for 3 hours to obtain a gas feed layer sheet coated with a reaction layer. The petroleum naphtha was removed from this sheet with an ethanol extractor. After drying, the sheet was pressed together with a silver gauze at 50 kg/cm$^2$ and 350° C. for 60 seconds to obtain an electrode.

The oxygen-reducing ability of this electrode was measured at 80° C. in 32% NaOH. As a result, the ability was found to be as high as 0.803 V (vs. RHE) at 30 A/dm$^2$.

Example 10

To 100 parts of solvent naphtha was added 10 parts of a hydrophobic carbon black (No. 6; average particle diameter, 500 Å; a trial product manufactured by Denki Kagaku Kogyo K. K.). This mixture was treated with an ultrasonic disperser to disperse the carbon black. To this dispersion was added 7 parts of a fine PTFE powder (F-103; manufactured by Daikin Industries, Ltd.). The resultant mixture was irradiated with ultrasonic to obtain a gas feed layer dispersion. The carbon black was mixed with the fine PTFE particles to give a curdy mixture, from which solvent naphtha separated. The curdy mixture was pressed on a fine gauze to remove the excess solvent naphtha therefrom. This pressed mixture was rolled to produce a gas feed layer sheet.

As demonstrated above, the invention produces the following effects. Since an organic solvent is used as a dispersion medium for carbon blacks, there is no need of using water and a surfactant in large amounts in preparing a carbon black dispersion. Namely, the use amounts of water and a surfactant can be reduced and a considerable cost reduction is attained. Since the amount of all the raw materials to be treated is reduced, a smaller equipment size is usable.

Furthermore, the same coagulation and resultant self-organization as in the case where an alcohol is added to a dispersion prepared from a carbon black and a PTFE dispersion to cause self-organization occur merely when a carbon black dispersion is mixed with a PTFE dispersion. Consequently, a satisfactory dispersion structure could be constituted through simplified steps. In addition, because of this step simplification, a reduced production time was attained.

Moreover, since a surfactant is not used in a large amount, the step of removing the surfactant after self-organization is easy, and a large amount of wastewater is never yielded.

While the invention has been described in detail and with reference to specific embodiments thereof, it will be apparent to one skilled in the art that various changes and modifications can be made therein without departing from the spirit and scope thereof.

What is claimed is:

1. A process for producing a reaction layer material or gas feed layer material for a gas diffusion electrode, which comprises the steps of:

dispersing a gas diffusion electrode raw material excluding polytetrafluoroethylene into an organic solvent to prepare a dispersion;

adding polytetrafluoroethylene to the dispersion to prepare a mixture; and mixing the mixture.

2. The process according to claim 1, wherein polytetrafluoroethylene is added in the form of dispersion.

3. The process according to claim 1, wherein polytetrafluoroethylene is added in the form of fine powder.

4. The process according to claim 1, wherein the mixing is conducted by or with the aid of ultrasonic irradiation or vigorous agitation or shaking.

5. The process according to claim 1, wherein the organic solvent comprises a solvent miscible with water.

6. The process according to claim 5, wherein the organic solvent comprises at least one member selected from the group consisting of methanol, ethanol, isopropyl alcohol, ethylene glycol, glycerol, and acetone.

7. The process according to claim 1, wherein the organic solvent is a solvent immiscible with water.

8. The process according to claim 7, wherein the organic solvent comprises at least one member selected from the group consisting of butyl acetate, solvent naphtha, petroleum naphtha, and fluorochemical solvents.

9. A process for producing a reaction layer material or gas feed layer material for a gas diffusion electrode, which comprises the steps of:

dispersing a gas diffusion electrode raw material consisting essentially of carbon blacks into an organic solvent so as to obtain a dispersion; said organic solvent being selected from the group consisting of ethanol, methanol, isopropyl alcohol, acetone, butyl acetate, solvent naphtha, toluene, xylene, petroleum ether, and fluorine-containing solvents; said organic solvent comprising 9–50 parts by weight per parts of the carbon blacks;

kneading said dispersion;

adding polytetrafluoroethylene to the dispersion to obtain a mixture; and mixing the mixture.

\* \* \* \* \*